United States Patent [19]
Sherk et al.

[11] 3,873,330
[45] Mar. 25, 1975

[54] BI$_2$O$_3$ AND AL$_2$O$_3$ CONTAINING PBO-ZNO-B$_2$O$_3$ LOW TEMPERATURE SEALING GLASS

[75] Inventors: Thomas A. Sherk, West Hurley; Rao R. Tummala, Wappingers Falls, both of N.Y.

[73] Assignee: International Business Machines Corporation, Armonk, N.Y.

[22] Filed: Nov. 19, 1973

[21] Appl. No.: 417,347

[52] U.S. Cl............... 106/47, 106/54, 106/53
[51] Int. Cl......... C03c 3/10, C03c 3/12, C03c 3/30
[58] Field of Search............... 106/47 R, 53

[56] References Cited
UNITED STATES PATENTS

| | | | |
|---|---|---|---|
| 2,931,142 | 4/1960 | Veres | 106/53 |
| 3,075,860 | 1/1963 | Veres | 106/53 |
| 3,127,278 | 3/1964 | Francel et al. | 106/53 |
| 3,291,586 | 12/1966 | Chapman et al. | 106/53 |

FOREIGN PATENTS OR APPLICATIONS

| | | | |
|---|---|---|---|
| 1,224,705 | 3/1971 | United Kingdom | 106/53 |
| 1,082,710 | 6/1960 | Germany | 106/53 |

*Primary Examiner*—Winston A. Douglas
*Assistant Examiner*—Mark Bell
*Attorney, Agent, or Firm*—Edward S. Gershuny

[57] ABSTRACT

Sealing glass which may be used for sealing glass plates together at relatively low temperatures. The glass has a softening temperature of about 412°C and has a thermal coefficient of expansion (from room temperature to 300°C) of about $84 \times 10^{-7}$ per °C. The glass consists substantially of the following constituents in the following proportions:

| | Percent by weight |
|---|---|
| PbO | 66.0 |
| B$_2$O$_3$ | 14.0 |
| ZnO | 10.5 |
| SiO$_2$ | 2.0 |
| CuO | 2.5 |
| Bi$_2$O$_3$ | 1.5 |
| Al$_2$O$_3$ | 3.5 |

1 Claim, No Drawings

$Bi_2O_3$ AND $Al_2O_3$ CONTAINING $PbO$-$ZnO$-$B_2O_3$ LOW TEMPERATURE SEALING GLASS

INTRODUCTION

This invention relates to sealing glass compositions. More particularly, the invention relates to glasses which have a relatively low softening temperature and have a thermal coefficient of expansion which makes them compatible with soda-lime-silica substrates.

When manufacturing gas panel display devices, one step in the manufacturing process involves the use of a sealing glass to join two prefabricated glass panels together in a fixed spacial relationship. In order to avoid the generation of conditions detrimental to the prefabricated panels, it is desirable that the sealing step be achieved at a relatively low temperature. It is also highly desirable that, as the sealed panels are cooled, both the sealing glass and the glass substrates of the panels undergo substantially the same amount of physical contraction. This is desirable because unequal amounts of contraction would introduce stresses into the sealed unit which could eventually cause cracking of the glass.

SUMMARY OF THE INVENTION

The sealing glass of this invention consists essentially of the following ingredients in the following proportions:

| | Per cent by weight |
|---|---|
| PbO | 66.0 |
| $B_2O_3$ | 14.0 |
| ZnO | 10.5 |
| $SiO_2$ | 2.0 |
| CuO | 2.5 |
| $Bi_2O_3$ | 1.5 |
| $Al_2O_3$ | 3.5 |

When the sealing glass of this invention is used in the process of manufacturing a gas display panel, the glass substrate of the prefabricated panels which are sealed together is typically a soda-lime-silica float glass having a thermal coefficient of expansion (TCE) of approximately $92 \times 10^{-7}$ per °C to the set point of the sealing glass (approximately 335°C). Therefore, the sealing glass should preferably have a TCE of approximately 90–94 to its set point. This corresponds to a TCE of approximately 80–84 in the temperature range from room temperature (approximately 22°C) to 300°C.

These glasses have softening temperatures of about 412°C and a TCE of about 84 (from room temperature to 300°C). The primary advantages of this invention are that the glass can be used for sealing at relatively low temperatures and that the glass has a thermal coefficient of expansion that is compatible with the prefabricated panels. The glass also has a minimal tendency towards crystallation.

DETAILED DESCRIPTION

The glass described herein consists essentially of the following ingredients in the following proportions.

| | Per cent by weight |
|---|---|
| PbO | 66.0 |
| $B_2O_3$ | 14.0 |
| ZnO | 10.5 |
| $SiO_2$ | 2.0 |
| CuO | 2.5 |
| $Bi_2O_3$ | 1.5 |
| $Al_2O_3$ | 3.5 |

The glass is preferably fired at about 1,060°C for three to 4 hours and a billet is made. The billet may then be used to draw rods for further use in fabricating the gas display panels.

The sealing glass composition is particularly suitable for use in fabricating gas display panels, especially when using a glass substrate which has a TCE equal to 89. (When thermal coefficients of expansion are given herein, they are expressed in units multiplied by $10^{-7}$/°C and refer to the temperature range from room temperature to 300°C.) It is also of significance that, when using this sealing glass, the prefabricated panels can be sealed together at a temperature below 460°C which is substantially below the crazing temperature of a magnesium oxide overcoat (485°–505°C) that results when using any of the dielectric glasses described in examples I–IV of copending application Ser. No. 374,189 filed June 27, 1973 for DIELECTRIC GLASS COMPOSITION. (For additional details of the process of manufacturing gas display panels, reference is made to copending application Ser. No. 214,348, filed Dec. 20, 1971, now abandoned for GAS PANEL FABRICATION by P. H. Haberland et al.)

As compared with some sealing glasses known in the prior art, characteristics which particularly distinguish the glasses described above are: the relatively low amount of lead oxide (PbO); the relatively high amount of zinc oxide (ZnO); and the addition of relatively small but critically important amounts of bismuth oxide ($Bi_2O_3$) and alumina ($Al_2O_3$). The latter two ingredients are of particular importance with respect to achieving the low-expansion and low-softening properties of these sealing glasses. The alumina is also of great importance with respect to minimization of crystallization. Considering its intended use in the manufacture of gas display panels, probably the most important difference between the glass described herein and those described in copending application Ser. No. 384,314 filed July 31, 1973 is the inclusion of alumina. This difference is important primarily because the alumina helps to minimize crystallization in the glass.

Those skilled in the art will recognize that the proportions for each of the ingredients specified above can be varied to a limited degree (as, for example, by minor trace impurities in one or more ingredients) without losing the desirable characteristics of the glass. However, because each proportion is fairly critical, it is recommended that variations not exceed ±0.8 percent for each ingredient which constitutes more than 10 percent of the glass, or ±0.5 percent for each ingredient which constitutes less than 10 percent of the glass.

While the invention has been particularly shown and described with reference to a preferred embodiment

What is claimed is:

1. A sealing glass composition having a thermal coefficient of expansion (from room temperature to 300°C) of about $84 \times 10^{-7}$ per °C consisting essentially of the following ingredients in the following proportions:

| | | Per cent by weight |
|---|---|---|
| Lead oxide | (PbO) | 66.0 |
| Boric oxide | ($B_2O_3$) | 14.0 |
| Zinc oxide | (ZnO) | 10.5 |
| Silicon oxide | ($SiO_2$) | 2.0 |
| Copper oxide | (CuO) | 2.5 |
| Bismuth oxide | ($Bi_2O_3$) | 1.5 |
| Alumina | ($Al_2O_3$) | 3.5. |

\* \* \* \* \*